W. RATICAN.
STREET WASHING AND SPRINKLING MACHINE.
APPLICATION FILED DEC. 19, 1906.
1,009,097.
Patented Nov. 21, 1911.
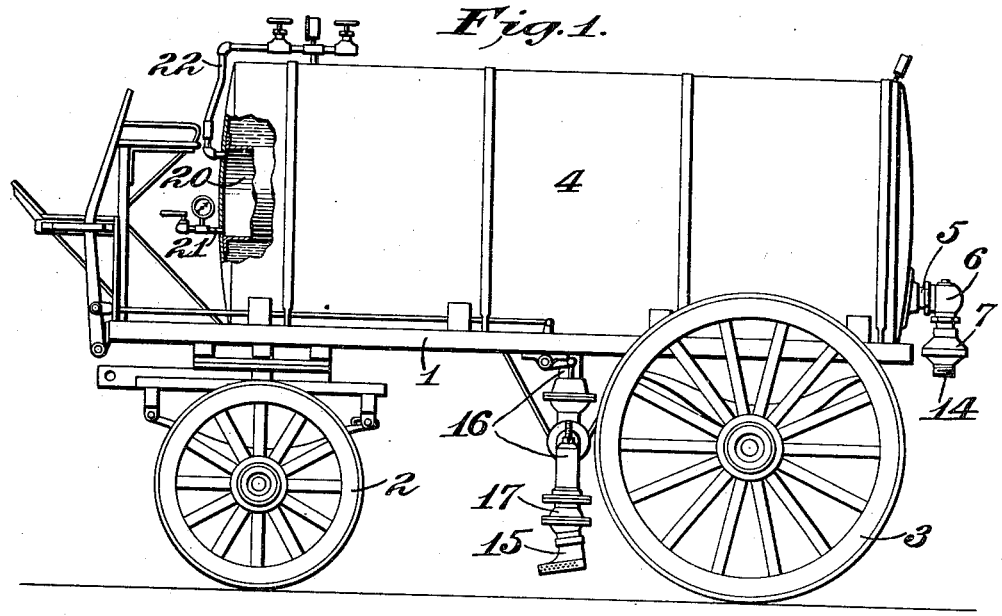
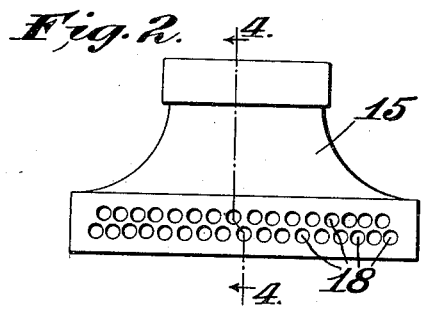
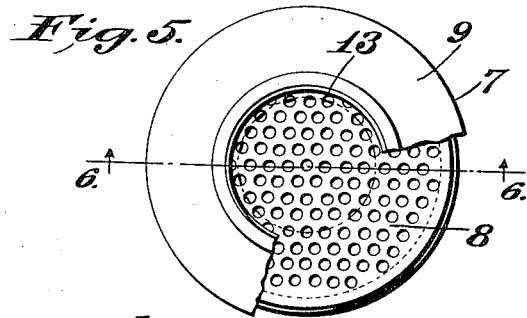
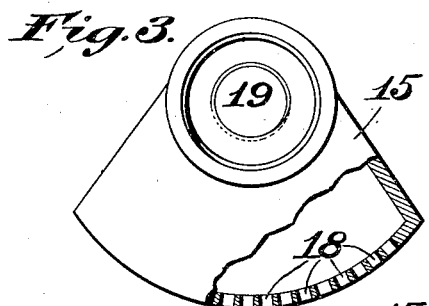
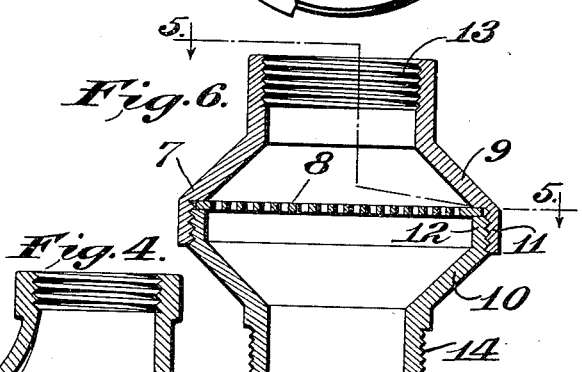
Witnesses:
G. A. Pennington
J. B. McGowan
Inventor:
William Ratican
By Carr & Carr,
Attys.

UNITED STATES PATENT OFFICE.

WILLIAM RATICAN, OF ST. LOUIS, MISSOURI, ASSIGNOR TO ST. LOUIS STREET FLUSHING MACHINE CO., OF ST. LOUIS, MISSOURI, A CORPORATION OF MISSOURI.

STREET WASHING AND SPRINKLING MACHINE.

1,009,097.  Specification of Letters Patent.  Patented Nov. 21, 1911.

Application filed December 19, 1906. Serial No. 348,516.

*To all whom it may concern:*

Be it known that I, WILLIAM RATICAN, a citizen of the United States, and a resident of the city of St. Louis and State of Missouri, have invented a new and useful Improvement in Street Washing and Sprinkling Machines, of which the following is a specification.

This invention relates to street washing and sprinkling apparatus and has for its principal objects to produce a traveling apparatus adapted for washing and sprinkling purposes; to prevent particles of solid substances from entering said apparatus; to prevent clogging of the nozzle or nozzles; and to attain certain advantages hereinafter more fully set forth.

The invention consists in the parts and in the arrangements and combinations of parts hereinafter described and claimed.

In the accompanying drawings which form part of this specification, and wherein like symbols refer to like parts wherever they occur, Figure 1 is a side elevation of an apparatus embodying my invention; Fig. 2 is a front view of a nozzle; Fig. 3 is a top plan view of a nozzle, a portion being shown in section; Fig. 4 is a section on the line 4—4 of Fig. 2; Fig. 5 is a plan view of the strainer, a portion being broken away to more clearly show the diaphragm; Fig. 6 is a section on the line 6—6 of Fig. 5.

The apparatus comprises a truck-frame 1 which is mounted on front and rear wheels 2 and 3, respectively. A tank 4 is mounted on the frame 1. This tank is adapted to contain water under pressure when the apparatus is to be used for washing and flushing purposes.

An intake water-pipe 5 opens into the rear of the tank 4 near the bottom. This pipe 5 is provided with an inwardly-opening check-valve 6. On the outer end of the pipe 5 is attached a casing 7 containing a perforated diaphragm 8. Preferably, the casing 7 comprises two sections 9 and 10 having flaring portions provided with screw-threaded flanges 11 and 12, respectively, whereby said sections may be detachably joined together. The perforated diaphragm 8 is secured between the two sections 9 and 10 of the casing. The section 9 is provided with a screw-threaded portion 13 for attachment to the pipe 5. The section 10 has a screw-threaded portion 14 adapted to receive the coupling member of a suitable hose-pipe (not shown) through which the tank may be filled with the water from a city main or other source of water supply.

The apparatus is provided with one or more delivery nozzles 15, as desired. Preferably, two nozzles are provided for the type of apparatus illustrated in the drawings. In this instance, it is desirable to locate the nozzles forward of the rear wheels. The nozzles 15 are preferably adjustably attached to a delivery-pipe 16 which extends laterally and downwardly from the bottom of the tank 4. The adjustment of the nozzles may be effected through the medium of a ball-and-socket or other suitable universal joint 17. The nozzle 15 is preferably sector shaped and its circular wall is provided with a series of perforations 18 which are slightly larger than the perforations in the strainer diaphragm 8.

The strainer 8 prevents large gravel or other particles from passing into the water-tank 4. By making each perforation in the delivery nozzles of larger area than the strainer perforations, any very small particles which might pass into the water-tank can be readily discharged out through the nozzle perforations, and clogging of the nozzles is thereby prevented. By removing a plug 19 from a screw-threaded opening in the bottom, the interior of the nozzle may be easily cleaned.

A pressure-tank 20 is mounted inside of the water-tank; and, for practical purposes, it is preferable to have it extend from end to end thereof. This pressure-tank may be charged through a pipe 21 from any suitable source of pressure supply. A second pipe 22 extends from said pressure-tank and communicates with the interior of the water-tank at the top thereof, so that pressure is at all times exerted on the contained body of water from above. In some instances, where the water supply is produced under heavy pressure, the pressure-tank may be charged by allowing the air within the water-tank to be displaced therefrom, and forced into the pressure-tank through the pipe 22 by the incoming water while said water-tank is being filled.

By simply maintaining the water in the water-tank under hydrostatic pressure and adjusting the nozzle to discharge slightly upward the apparatus may be used for sprinkling purposes, as distinguished from washing and flushing, for which latter purposes the water must be discharged downwardly at an inclination and under heavy pressure. In some instances, where a relatively wide street is to be sprinkled, the water is discharged from the nozzle under heavy pressure.

Obviously, my device admits of considerable modification within the scope of my invention, and therefore I do not wish to be limited to the particular construction shown and described.

What I claim as my invention and desire to secure by Letters Patent is:

1. A traveling street washing and sprinkling apparatus comprising a water-tank having a downturned supply-pipe and a delivery-pipe, a strainer in said supply-pipe close to and above the open end thereof, and a nozzle on said delivery-pipe, the openings of said nozzle being larger than the openings of said strainer.

2. A traveling street washing apparatus comprising a water-tank adapted to contain water under pressure, a downturned supply-pipe for said water-tank, a strainer in said supply-pipe close to and above the open end thereof, a delivery-pipe for said water-tank, and a nozzle on said delivery-pipe having a plurality of delivery-apertures larger than the apertures of said strainer.

3. A traveling watering apparatus comprising a water-tank, a downturned supply-pipe for said water-tank, a strainer located in said supply-pipe close to and above the open end thereof and comprising a perforated diaphragm, a delivery-pipe for said water-tank, and a nozzle on said delivery-pipe having a plurality of comparatively small delivery-apertures arranged in parallel rows, the delivery apertures being larger than the apertures of the strainer, the delivery-apertures of one row being arranged to overlap two adjacent apertures in another row.

4. A traveling street washing and sprinkling apparatus comprising a water tank having a down-turned supply-pipe and a delivery-pipe, valves in said pipes, a strainer in said supply-pipe close to and above the open end thereof, the free passage through the strainer being of not greater width than the narrowest width of the passage through the valves or delivery pipe.

In testimony whereof, I have signed my name to this specification in the presence of two subscribing witnesses this 15th day of December, 1906, at St. Louis, Missouri.

WILLIAM RATICAN.

Witnesses:
J. B. MEGOWN,
G. A. PENNINGTON.

---

Copies of this patent may be obtained for five cents each, by addressing the "Commissioner of Patents, Washington, D. C."